May 30, 1972 C. A. VAN HORN 3,666,391
ANTI-FLASHBACK DEVICE
Filed April 27, 1970 3 Sheets-Sheet 3

INVENTOR
CHARLES A. VanHORN
BY
Mason, Kolehmainen, Rathburn & Wyss
ATT'YS

United States Patent Office 3,666,391
Patented May 30, 1972

3,666,391
ANTI-FLASHBACK DEVICE
Charles A. Van Horn, Country Club Hills, Ill., assignor to Chemetron Corporation, Chicago, Ill.
Filed Apr. 27, 1970, Ser. No. 32,296
Int. Cl. F23n 1/02
U.S. Cl. 431—12
16 Claims

ABSTRACT OF THE DISCLOSURE

Flashback, backfire, and carbon deposits in an oxy-fuel torch are prevented by placing the flow of oxygen under the control of a pressure responsive switch connected to the fuel line. When the fuel is turned off, this switch maintains the flow of oxygen so as to prevent a carbonizing flame from developing before the residual fuel is consumed, but cuts off the flow of oxygen before dangerous concentrations of oxygen can develop in the fuel line. At the time of ignition, this same pressure switch prevents oxygen from entering the fuel line before the flow of fuel is established and thereby prevents flashback and backfire.

Figure 1:
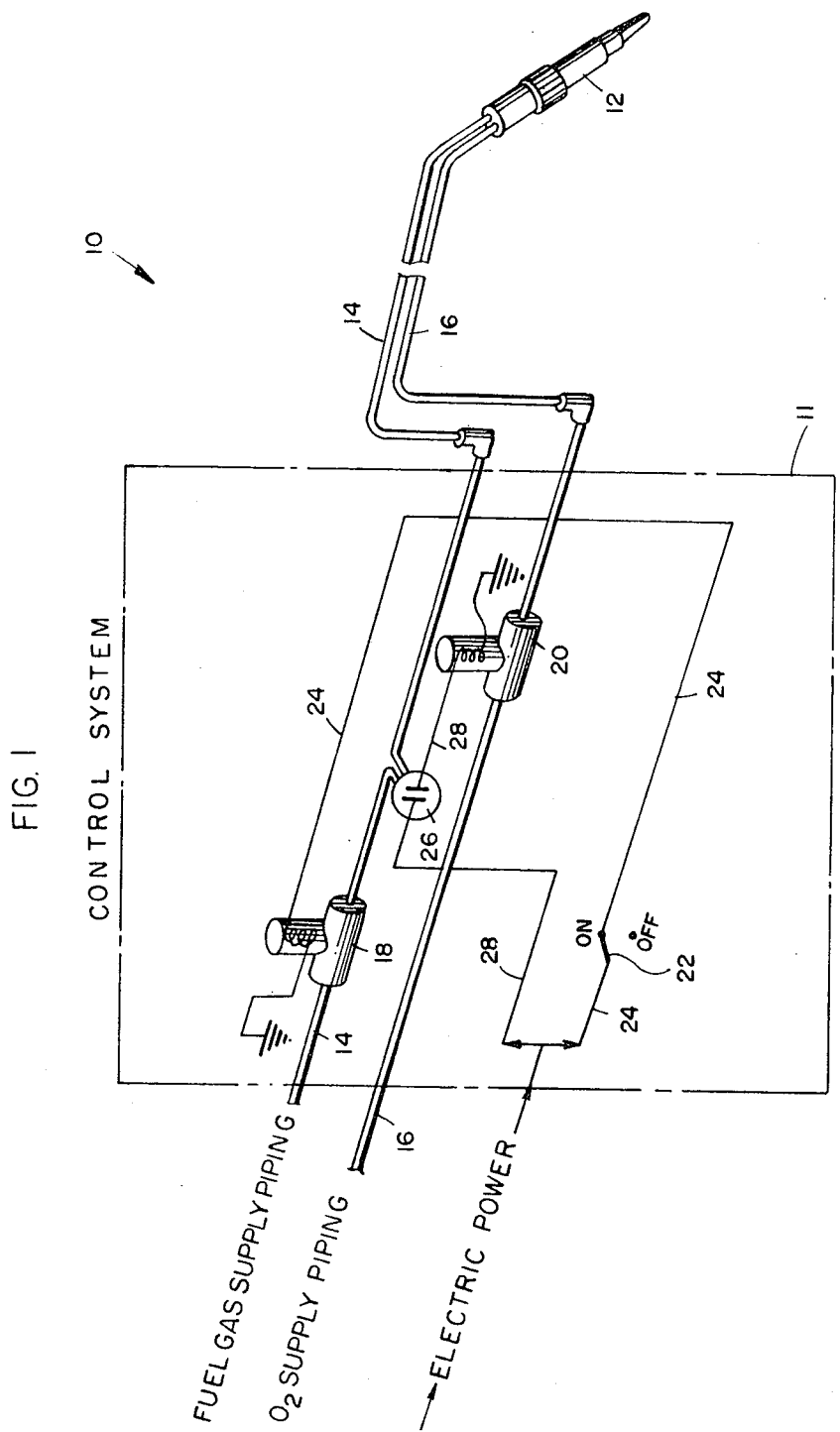

The present invention relates to torches which burn highly volatile fuels with pressurized oxygen. More particularly, the present invention relates to a novel arrangement for preventing flashback or backfire from occurring when such a torch is first ignited and for preventing carbon deposits from developing when such a torch is extinguished.

Oxy-fuel torches are widely used in industry for cutting, welding, flame hardening, and for many other uses. These torches include a source of oxygen; a source of fuel, generally acetylene; and some form of burner, such as a blow pipe, cutting head, or flame hardener. Two or more burners, blow pipes, or cutting heads are often incorporated into a single torch. Heavy industrial torches often can be equipped with any desired number of burners in accordance with the requirements of any particular job.

In the design of such torches, two serious problems are encountered. The first is that of carbon deposits forming within the oxygen and fuel lines when a torch is extinguished. These carbon deposits are the result of a carbonizing (or carburizing) flame that develops whenever insufficient oxygen is present to fully oxidize the fuel. If both the oxygen and the fuel supplies are turned off simultaneously, the oxygen quickly dissipates and leaves a mixture within the torch that is overly rich. Incomplete burning occurs, and the yellow flame which results contains large amounts of carbon and carbon monoxide. A 3 to 1 mixture of fuel and oxygen burns properly, but a 5 to 1 mixture is explosive. A "bang" or "pop" occurs and drives carbon particles back into both the oxygen and fuel lines. The second problem is that of preventing flashback or backfiring from occurring when a torch is first ignited. Flashback or backfiring results when a combustible mixture of oxygen and fuel is present within the fuel line. Upon ignition, the flame burns back into the fuel line, sometimes as far back as the fuel valve. This may cause an explosion or backfire which may do nothing more than damage the fuel valve or may cause more serious damage. However, it is possible for burning to be sustained within the fuel line, in which case the condition is called "flashback." Flashback can destroy the oxygen and fuel supply equipment and can injure personel in the vicinity.

Various techniques have been developed to deal with the above mentioned problems. Most oxy-fuel torches are designed so that the oxygen valve is left on for a predetermined amount of time after the fuel valve closes, and so that the oxygen valve is not turned on for a predetermined amount of time after the fuel valve is opened. Simple time delay arrangements of this type are not satisfactory, however, in the more sophisticated torches which have interchangeable burners and variable numbers of burners. Delay times suitable for one burner or group of burners may be totally unsuitable for another burner or group of burners. The delay time required can vary from one tenth of a second for a very simple cutting element to as much as fifteen seconds for a complex, multiple element surface hardener. If the delay time is too short, a carbonizing flame and carbon deposits result when the torch is turned off, and backfire or flashback can occur when the torch is ignited. If the delay time is too long, oxygen under pressure is forced into the fuel line at the time the torch is turned off, thus creating a backfire or flashback hazard when the torch is next ignited.

A primary object of the present invention is therefore the provision of means for automatically cutting off the flow of oxygen to any oxy-fuel torch after the danger of a carbonizing flame has ceased, but before significant amounts of oxygen are forced into the fuel line.

Another object of the present invention is to delay the onset of the flow of oxygen until the fuel line is sufficiently pressurized so that any air or oxygen present in the fuel line is purged and further so that large amounts of oxygen cannot be forced into the fuel line at the time of ignition.

A further object of the present invention is to accomplish both of the above results automatically for any burner or combination of burners that can be used with a given torch regardless of the variations in oxygen turn-on and turn-off time that might be required by the burners.

In accordance with these and many other objects, the present invention comprises briefly pressure actuated means in the fuel line that controls the flow of oxygen. In the preferred embodiment, this means comprises a pressure actuated electrical switch in the fuel line which controls a solenoid actuated valve in the oxygen line. The valve in the oxygen line is either open or closed in accordance with whether the pressure of the fuel line is above or below a predetermined threshold pressure level. When the torch is turned on, the fuel valve is opened. After a sufficient pressure is developed within the fuel line, the pressure actuated means opens the valve in the oxygen line and allows the flow of oxygen to commence.

In this manner, the flow of oxygen is held back until sufficient fuel pressure is developed to keep the oxygen out of the fuel line, thereby preventing flashback or backfiring at the time of ignition. When the torch is turned off, the fuel valve is closed, but the flow of oxygen is maintained by the pressure actuated means. The presence of this extra oxygen makes it difficult for a carbonizing flame to develop and makes it almost impossible for an explosive mixture to develop. The pressure actuated means terminates the flow of oxygen, however, before large quantities of oxygen are forced into the fuel line. This greatly reduces the danger of flashback or backfire when the torch is next ignited. When the pressure actuated means is properly adjusted, the torch can accept numerous sizes and combinations of burners without further readjustment.

Further objects and advantages of the present invention are apparent in the detailed description which follows, and the features of novelty which characterize the present invention will be pointed out with particularity in the claims annexed to and forming a part of this specification.

Figure 2:
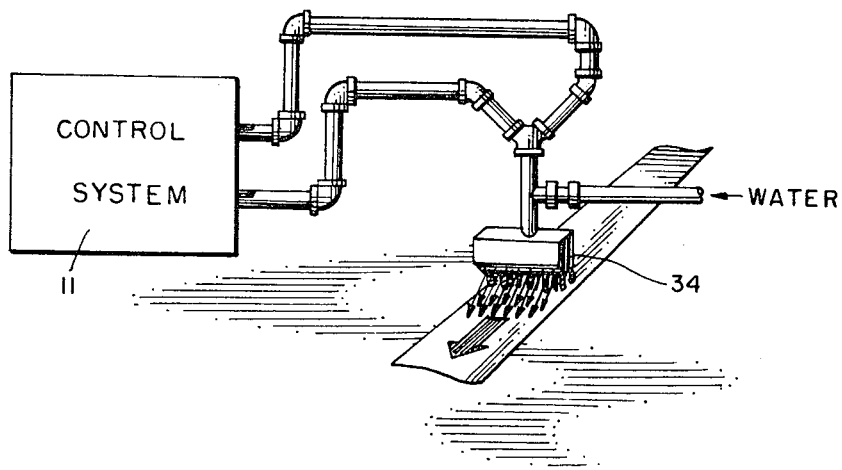
Figure 3:
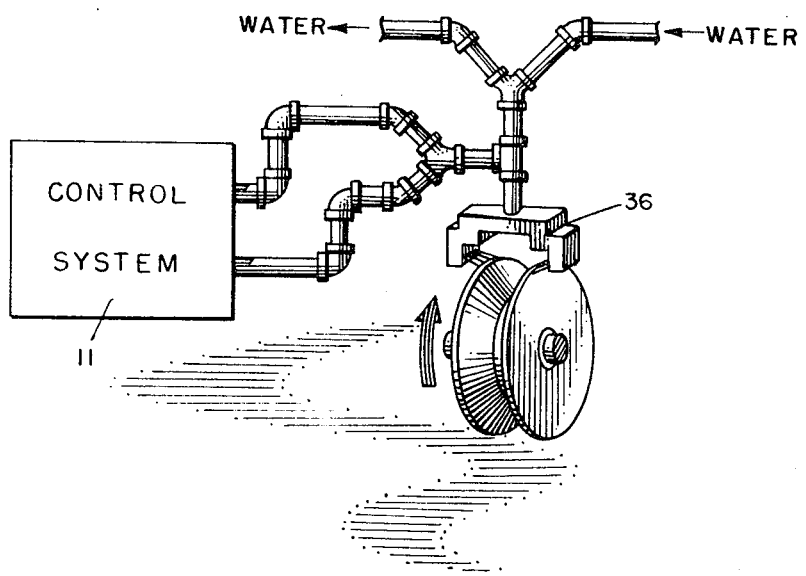
Figure 4:
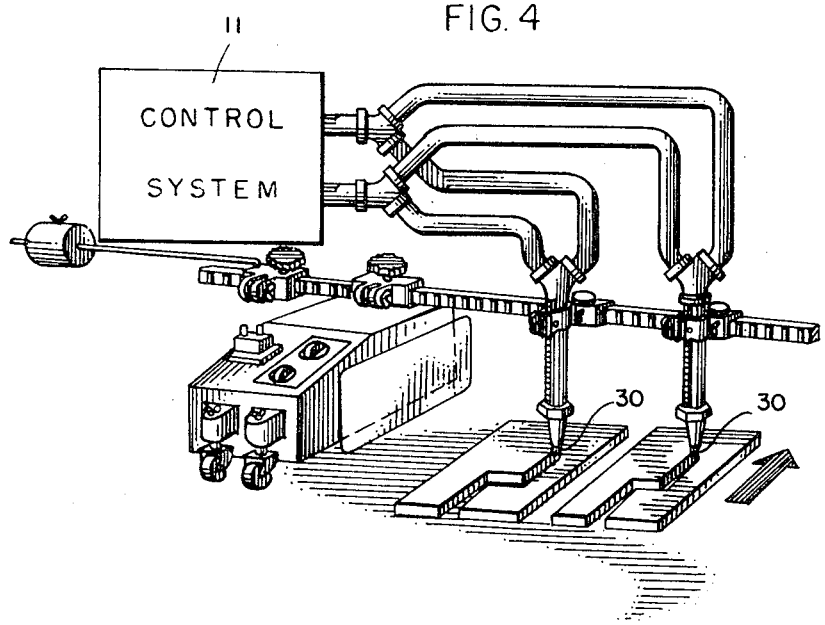
Figure 5:
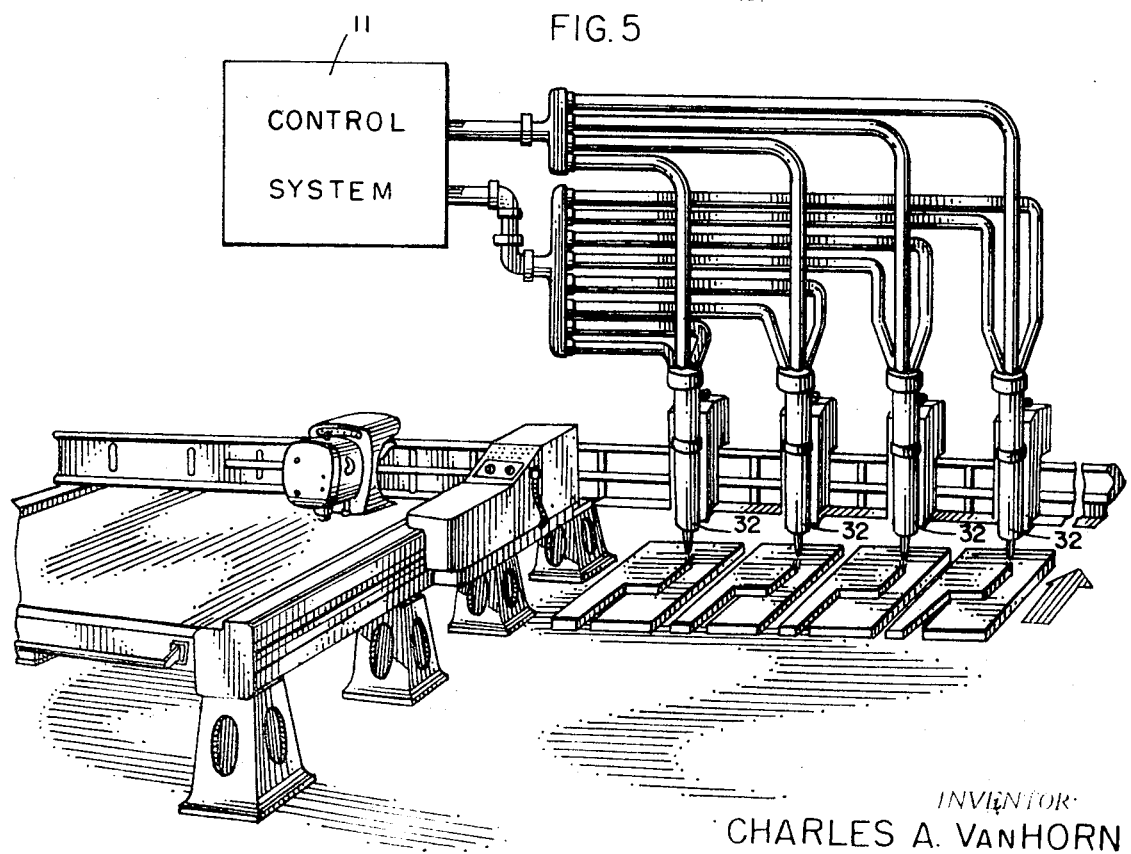

For further understanding of the present invention, reference is made to the drawings wherein:

FIG. 1 is a diagrammatic representation of an oxyacetylene cutting torch designed in accordance with the present invention; and FIGS. 2 through 5 are various assemblies of burners which can be used as part of the torch in FIG. 1 without modification of the circuit, FIG. 2 is a perspective view of a combination flame hardening and water quenching tool, FIG. 3 is a perspective view of a smaller flame hardening tool, FIG. 4 is a perspective view of a portable, two-torch metal cutting apparatus, and FIG. 5 is a perspective view of an automatic, four-torch metal cutting apparatus.

Referrnig now to the drawings, FIG. 1 shows a torch 10 designed in accordance with the present invention. The torch 10 comprises a blow pipe 12 connected to a control system 11. The blow pipe 12 is supplied with fuel by a fuel line 14 and with oxygen by an oxygen line 16. A first solenoid actuated valve 18 in the fuel line 14 controls the flow of fuel to the blow pipe 12, and a second solenoid actuated valve 20 in the oxygen line 16 controls the flow of oxygen to the blow pipe 12. A switch 22 controls the flow of electrical current over a line 24 from an electrical power source (not shown) to the first solenoid actuated valve 18. In accordance with the present invention, a pressure actuated switch 26, located in the fuel line 14, controls the flow of electric power over a line 28 to the second solenoid actuated valve 20. The pressure actuated switch 26 is positioned on the downstream side of the first solenoid actuated valve 18. When the pressure in the fuel line 14 drops below a predetermined level, the pressure actuated switch 26 opens a set of contacts to stop the flow of electricity through the line 28. Similarly, when the pressure in the fuel line 14 rises above this same level, the pressure actuated switch 26 closes a set of electrical contacts and allows current to flow through the line 28. The particular level at which the pressure actuated switch is adjusted to open or to close the electrical contacts is determined by experimentation. The pressure setting must be low enough so that when the fuel supply is turned off carbon is not blown back into the oxygen and fuel lines 14 and 16. The pressure setting must not be so low as will allow significant amounts of oxygen to be forced into the fuel line 14 after the fuel supply is first turned off, or after the fuel supply is first turned on, for this would create a danger of flashback and backfire. In one practical embodiment of the present invention, the pressure actuated switch is adjusted to open or close the electrical contacts when the pressure within the fuel line reaches about ⅓ p.s.i.g., or ten inches of water. In this particular embodiment, oxygen is supplied at ten p.s.i.g. and acetylene is supplied as fuel at 5 p.s.i.g. This pressure setting is adequate to prevent carbon deposits from developing within the fuel line and to virtually eliminate the dangers of flashback and backfire. With different supply pressures for the oxygen and the acetylene a different setting of the pressure actuated switch will usually be required. The proper setting is found quite easily by experimentation. If an objectionable carbonizing flame is produced when the fuel is turned off or if a "pop" occurs when the carbonizing flame disappears, the pressure setting is reduced. Generally the pressure setting is left at that point when an extremely small pop occurs with the arrangement of cutting heads or blow pipes that is most likely to produce such a pop. The pressure is not reduced below this point because a further reduction of the pressure setting can force oxygen into the fuel line and create a danger of flashback and backfire when the fuel supply is again turned on and ignited.

In the preferred embodiment of the present invention, the pressure actuated switch 26 is a normally open switch and the solenoid actuated valve 20 is a normally closed valve. If desired, the pressure actuated switch 26 can be a normally closed switch and the solenoid actuated valve 20 can be a normally open valve. Other equivalent fuel pressure responsive oxygen control valve arrangements may also be used in constructing the control system 11. For example a pneumatic or hydraulic or other fluidic control valve in the oxygen line can be actuated by pressure from the fuel line.

FIGS. 2 to 5 are included to show the usefulness of the present invention. They illustrate how a single control system 11 designed as shown in FIG. 1 can be used with a wide variety of cutting torches 30 and 32 in FIGS. 4 and 5 respectively and flame hardeners 34 and 36 in FIGS. 2 and 3 respectively without flashback or backfiring and without carbon deposits developing. The reason for this is that the pressure actuated swith 26 automatically adjusts the time interval between actuation of the fuel supply valve and actuation of the oxygen supply valve to compensate for any changes that are made in the size or number of burners. This greatly simplifies the procedure of setting up any particular arrangement and makes it unnecessary to readjust a time delay in the system when burners are changed. The possibility of an explosion occurring when an employee forgets to readjust the system time delay is also eliminated.

While a single embodiment of the present invention has been shown, it will be understood that numerous modifications and changes can be made by those skilled in the art. It is therefore intended by the appended claims to cover all such modifications and changes as come within the true spirit and scope of the present invention.

What is claimed as new and desired to be secured by Letters Patent of the United States is:

1. A control system for controlling the flow of oxygen from a pressurized oxygen source and the flow of fuel from a pressurized fuel source to a burner having oxygen and fuel line inputs, said control system comprising:
   an oxygen line connecting said pressurized oxygen source to the oxygen line input of said burner;
   a fuel line connecting said pressurized fuel source to the fuel line input of said burner;
   pressure actuated means connected to said fuel line and generating a control signal indicating whether the pressure within said fuel line is above or below a predetermined pressure level;
   oxygen control valve means located in said oxygen line and energized by said control signal in such a manner that the oxygen control valve means opens whenever said signal indicates the fuel line pressure is above said predetermined pressure and closes whenever said signal indicates the fuel line pressure is below said predetermined pressure; and
   wherein means are provided for connecting additional burners to the oxygen and fuel lines.

2. A control system in accordance with claim 1 wherein the oxygen control valve means is electrically actuated, and wherein the control signal generated by the pressure actuated means is an electrical control signal and is used to electrically actuate the oxygen control valve means.

3. A control system in accordance with claim 2 to which has been added a source of electrical power, and wherein the pressure actuated switch means mechanically actuates electrical switch means connecting the source of electrical power to the oxygen control valve in response to a change in pressure within the fuel line.

4. A control system in accordance with claim 2 wherein the oxygen control valve means is actuated by a solenoid which in turn is actuated by the control signal.

5. A control system for controlling the flow of oxygen from a pressurized oxygen source and the flow of fuel from a pressurized fuel source to a burner having oxygen and fuel line inputs, said control system comprising:
   an oxygen line connecting said pressurized oxygen source to the oxygen line input of said burner;

a fuel line connecting said pressurized fuel source to the fuel line input of said burner;

pressure actuated means connected to said fuel line and generating a control signal indicating whether the pressure within said fuel line is above or below a predetermined pressure level;

oxygen control valve means located in said oxygen line and energized by said control signal in such a manner that the oxygen control valve means opens whenever said signal indicates the fuel line pressure is above said predetermined pressure and closes whenever said signal indicates the fuel line pressure is below said predetermined pressure; and a plurality of burners or sets of burners which are interchangeable with one another and which have different oxygen and fuel requirements and volumes.

6. A control system in accordance with claim 5 wherein the burner is an oxy-fuel cutting torch.

7. A control system in accordance with claim 5 wherein the burner is a plurality of oxy-fuel cutting torches.

8. A control system in accordance with claim 5 wherein the burner is an oxy-fuel surface hardener.

9. A control system in accordance with claim 5 wherein the burner is a blow pipe.

10. A control system in accordance with claim 5 wherein the oxygen control valve means is electrically actuated, and wherein the control signal generated by the pressure actuated means is an electrical control signal and is used to electrically actuate the oxygen control valve means.

11. A control system in accordance with claim 10 to which has been added a source of electrical power, and wherein the pressure actuated switch means mechanically actuates electrical switch means connecting the source of electrical power to the oxygen control valve in response to a change in pressure within the fuel line.

12. A control system in accordance with claim 10 wherein the oxygen control valve means is actuated by a solenoid which in turn is actuated by the control signal.

13. A method for controlling combustion in an oxy-fuel combustion system wherein the oxygen supply and the fuel supply are separately controlled, comprising the steps of:

monitoring the fuel supply pressure;

starting the flow of oxygen whenever the fuel supply pressure rises above the pressure level at which the oxygen flow may be started without a substantial risk of flashback or backfiring; and stopping the flow of oxygen whenever the fuel supply pressure falls below the pressure level at which the oxygen flow may be turned off without a substantial carburizing flame developing and without substantial risk of explosion.

14. A method for controlling combustion in an oxy-fuel combustion system wherein the oxygen supply and the fuel supply are separately controlled, comprising the steps of:

initiating combustion by starting the flow of fuel and by igniting the fuel;

monitoring the fuel supply pressure; and starting the flow of oxygen whenever the fuel supply pressure rises above the pressure level at which the oxygen flow may be started without a substantial risk of flashback or backfiring.

15. A method in accordance with claim 14 to which are added the following steps:

terminating combustion by stopping the flow of fuel; and stopping the flow of oxygen whenever the fuel supply pressure falls below the pressure level at which the oxygen flow may be turned off without a substantial carburizing flame developing and without substantial risk of explosion.

16. A method for terminating combustion in an oxy-fuel combustion system wherein the oxygen supply and the fuel supply are separately controlled, comprising the steps of:

terminating combustion by stopping the flow of fuel;

monitoring the fuel supply pressure; and stopping the flow of oxygen when the fuel supply pressure falls below the pressure level at which the oxygen flow may be turned off without a substantial carburizing flame developing and without substantial risk of explosion.

References Cited
UNITED STATES PATENTS

| 3,180,396 | 4/1965 | Eichelman et al. | 431—90 X |
| 2,986,207 | 5/1961 | Scogin | 431—90 X |

EDWARD G. FAVORS, Primary Examiner

U.S. Cl. X.R.

431—90